United States Patent
Ansari et al.

(10) Patent No.: US 11,631,851 B2
(45) Date of Patent: *Apr. 18, 2023

(54) METHOD AND SYSTEM FOR MULTIPLE CARBON PRECURSORS FOR ENHANCED BATTERY ELECTRODE ROBUSTNESS

(71) Applicant: Enevate Corporation, Irvine, CA (US)

(72) Inventors: Younes Ansari, Irvine, CA (US); Giulia Canton, Irvine, CA (US); Frederic Bonhomme, Lake Forest, CA (US); Benjamin Park, Mission Viejo, CA (US)

(73) Assignee: Enevate Corporation, Irvine, CA (US)

( * ) Notice: Subject to any disclaimer, the term of this patent is extended or adjusted under 35 U.S.C. 154(b) by 195 days.

This patent is subject to a terminal disclaimer.

(21) Appl. No.: 17/095,343

(22) Filed: Nov. 11, 2020

(65) Prior Publication Data

US 2021/0194001 A1 Jun. 24, 2021

Related U.S. Application Data

(63) Continuation of application No. 16/719,692, filed on Dec. 18, 2019, now Pat. No. 10,840,512.

(51) Int. Cl.
*H01M 4/583* (2010.01)
*H01M 4/04* (2006.01)
(Continued)

(52) U.S. Cl.
CPC ......... *H01M 4/583* (2013.01); *H01M 4/0471* (2013.01); *H01M 4/364* (2013.01); *H01M 4/386* (2013.01)

(58) Field of Classification Search
None
See application file for complete search history.

(56) References Cited

U.S. PATENT DOCUMENTS

| 10,840,512 B1* | 11/2020 | Ansari | H01M 4/364 |
| 2011/0177393 A1* | 7/2011 | Park | C04B 35/532 |
| | | | 252/502 |

(Continued)

OTHER PUBLICATIONS

Notification of Transmittal of the International Search Report and the Written Opinion of the International Searching Authority, or the Declaration for International Application No. PCT/US2020/063027, International Filing Date Dec. 3, 2020, dated Jan. 28, 2021.

(Continued)

*Primary Examiner* — Lisa S Park
(74) *Attorney, Agent, or Firm* — McAndrews Held & Malloy, Ltd.

(57) ABSTRACT

Systems and methods for multiple carbon precursors for enhanced battery electrode robustness may include an electrode having an active material, the active material including two or more carbon precursor materials, wherein the carbon precursor materials have different pyrolysis temperatures. A battery may include the electrode. The carbon precursor materials may include polyimide (PI) and polyamide-imide (PAI). The active material may be pyrolyzed at a temperature such that a first carbon precursor material is partially pyrolyzed and a second carbon precursor material is completely pyrolyzed. The carbon precursor materials may include two or more of PI, PAI, carboxymethyl cellulose (CMC), styrene-butadiene rubber (SBR), polyacrylonitrile (PAN), and sodium alginate. The active material may include silicon constituting at least 50% of weight of a formed anode after pyrolysis. The active material may include silicon constituting up to 97% of weight of a formed electrode after pyrolysis.

22 Claims, 8 Drawing Sheets

(51) Int. Cl.
*H01M 4/36* (2006.01)
*H01M 4/13* (2010.01)
*H01M 4/62* (2006.01)
*H01M 4/66* (2006.01)
*H01M 4/587* (2010.01)
*C01B 32/00* (2017.01)
*H01M 4/38* (2006.01)

(56) References Cited

U.S. PATENT DOCUMENTS

2013/0236784 A1* 9/2013 Lin .................. H01M 4/13
 429/212
2016/0156024 A1* 6/2016 Kinpara ............ H01M 4/386
 252/511
2018/0108941 A1 4/2018 Lee et al.

OTHER PUBLICATIONS

Int'l Preliminary Report on Patentability Appln No. PCT/US2020/063027 dated Jun. 30, 2022.

* cited by examiner

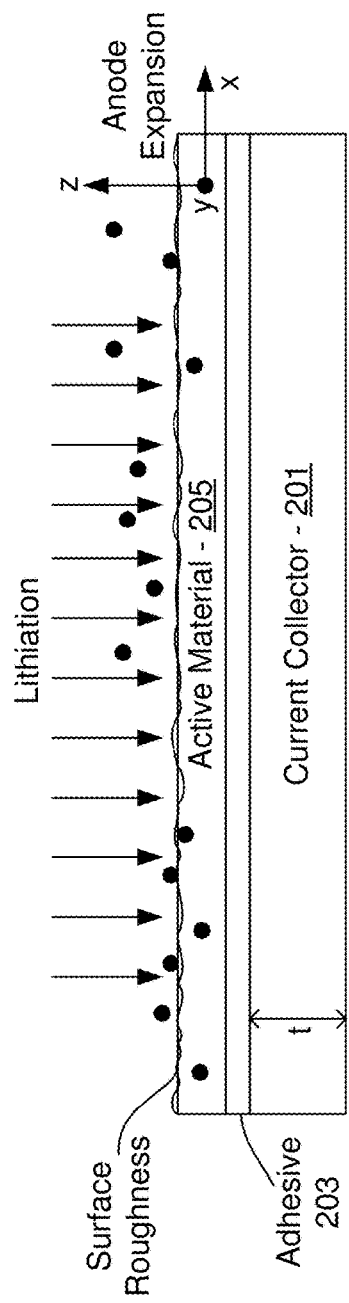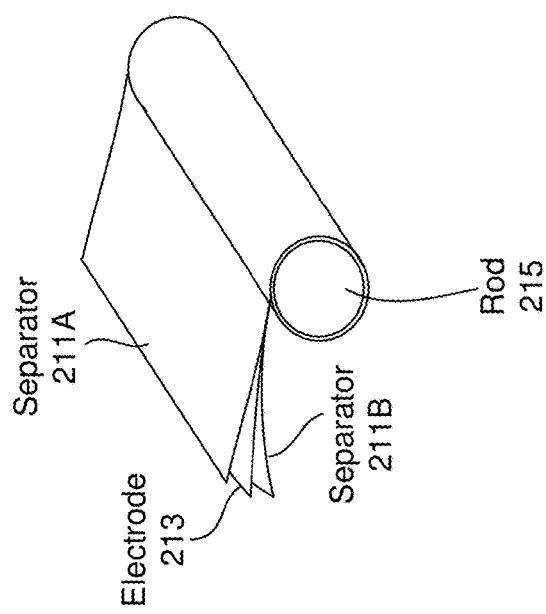
FIG. 2

METHOD AND SYSTEM FOR MULTIPLE CARBON PRECURSORS FOR ENHANCED BATTERY ELECTRODE ROBUSTNESS

CLAIM OF PRIORITY

This application is a continuation of U.S. application Ser. No. 16/719,692 filed on Dec. 18, 2019, now U.S. Pat. No. 10,840,512, which is hereby incorporated herein by reference in its entirety.

FIELD

Aspects of the present disclosure relate to energy generation and storage. More specifically, certain embodiments of the disclosure relate to a method and system for multiple carbon precursors for enhanced electrode robustness.

BACKGROUND

Conventional approaches for battery electrodes may be costly, cumbersome, and/or inefficient—e.g., they may be complex and/or time consuming to implement, and may limit battery lifetime.

Further limitations and disadvantages of conventional and traditional approaches will become apparent to one of skill in the art, through comparison of such systems with some aspects of the present disclosure as set forth in the remainder of the present application with reference to the drawings.

BRIEF SUMMARY

A system and/or method are provided for multiple carbon precursors for enhanced electrode robustness, substantially as shown in and/or described in connection with at least one of the figures, as set forth more completely in the claims.

These and other advantages, aspects and novel features of the present disclosure, as well as details of an illustrated embodiment thereof, will be more fully understood from the following description and drawings.

BRIEF DESCRIPTION OF SEVERAL VIEWS OF THE DRAWINGS

FIG. 2 illustrates types of stress on battery electrodes, in accordance with an example embodiment of the disclosure.

DETAILED DESCRIPTION

Figure 1:
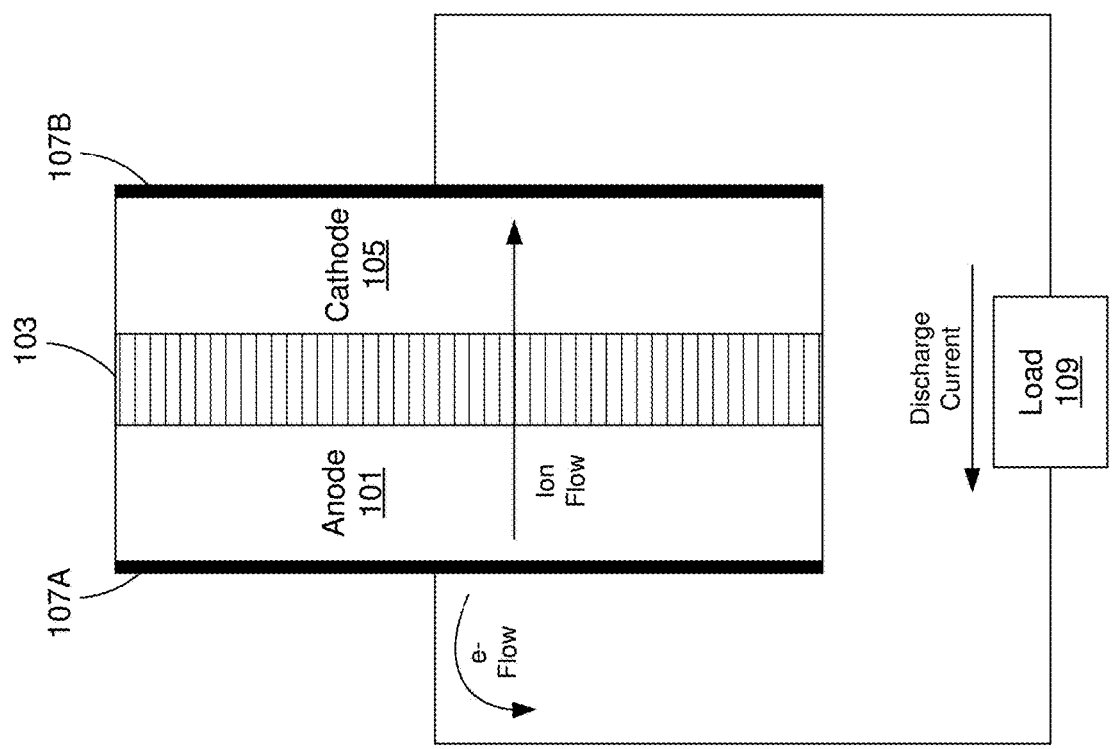
FIG. 1 is a diagram of a battery, in accordance with an example embodiment of the disclosure.

FIG. 1 is a diagram of a battery, in accordance with an example embodiment of the disclosure. Referring to FIG. 1, there is shown a battery 100 comprising a separator 103 sandwiched between an anode 101 and a cathode 105, with current collectors 107A and 107B. There is also shown a load 109 coupled to the battery 100 illustrating instances when the battery 100 is in discharge mode. In this disclosure, the term "battery" may be used to indicate a single electrochemical cell, a plurality of electrochemical cells formed into a module, and/or a plurality of modules formed into a pack.

The development of portable electronic devices and electrification of transportation drive the need for high performance electrochemical energy storage. Small-scale (<100 Wh) to large-scale (>10 KWh) devices primarily use lithium-ion (Li-ion) batteries over other rechargeable battery chemistries due to their high-performance.

The anode 101 and cathode 105, along with the current collectors 107A and 107B, may comprise the electrodes, which may comprise plates or films within, or containing, an electrolyte material, where the plates may provide a physical barrier for containing the electrolyte as well as a conductive contact to external structures. In other embodiments, the anode/cathode plates are immersed in electrolyte while an outer casing provides electrolyte containment. The anode 101 and cathode are electrically coupled to the current collectors 107A and 1078, which comprise metal or other conductive material for providing electrical contact to the electrodes as well as physical support for the active material in forming electrodes.

The configuration shown in FIG. 1 illustrates the battery 100 in discharge mode, whereas in a charging configuration, the load 109 may be replaced with a charger to reverse the process. In one class of batteries, the separator 103 is generally a film material, made of an electrically insulating polymer, for example, that prevents electrons from flowing from anode 101 to cathode 105, or vice versa, while being porous enough to allow ions to pass through the separator 103. Typically, the separator 103, cathode 105, and anode 101 materials are individually formed into sheets, films, or active material coated foils. Sheets of the cathode, separator and anode are subsequently stacked or rolled with the separator 103 separating the cathode 105 and anode 101 to form the battery 100. In some embodiments, the separator 103 is a sheet and generally utilizes winding methods and stacking in its manufacture. In these methods, the anodes, cathodes, and current collectors (e.g., electrodes) may comprise films.

In an example scenario, the battery 100 may comprise a solid, liquid, or gel electrolyte. The separator 103 preferably does not dissolve in typical battery electrolytes such as compositions that may comprise: Ethylene Carbonate (EC), Fluoroethylene Carbonate (FEC), Propylene Carbonate (PC), Dimethyl Carbonate (DMC), Ethyl Methyl Carbonate (EMC), Diethyl Carbonate (DEC), etc. with dissolved $LiBF_4$, $LiAsF_6$, $LiPF_6$, and $LiClO_4$ etc. The separator 103 may be wet or soaked with a liquid or gel electrolyte. In addition, in an example embodiment, the separator 103 does not melt below about 100 to 120° C., and exhibits sufficient mechanical properties for battery applications. A battery, in operation, can experience expansion and contraction of the anode and/or the cathode. In an example embodiment, the separator 103 can expand and contract by at least about 5 to 10% without failing, and may also be flexible.

The separator 103 may be sufficiently porous so that ions can pass through the separator once wet with, for example, a liquid or gel electrolyte. Alternatively (or additionally), the separator may absorb the electrolyte through a gelling or other process even without significant porosity. The porosity of the separator 103 is also generally not too porous to allow the anode 101 and cathode 105 to transfer electrons through the separator 103.

The anode 101 and cathode 105 comprise electrodes for the battery 100, providing electrical connections to the device for transfer of electrical charge in charge and discharge states. The anode 101 may comprise silicon, carbon, or combinations of these materials, for example. Typical anode electrodes comprise a carbon material that includes a current collector such as a copper sheet. Carbon is often used because it has excellent electrochemical properties and is also electrically conductive. Anode electrodes currently used in rechargeable lithium-ion cells typically have a specific capacity of approximately 200 milliamp hours per gram. Graphite, the active material used in most lithium ion battery anodes, has a theoretical energy density of 372 milliamp hours per gram (mAh/g). In comparison, silicon has a high theoretical capacity of 3579 mAh/g. In order to increase volumetric and gravimetric energy density of lithium-ion batteries, silicon may be used as the active material for the cathode or anode. Silicon anodes may be formed from silicon composites, with more than 50% silicon, for example.

In an example scenario, the anode 101 and cathode 105 store the ion used for separation of charge, such as lithium. In this example, the electrolyte carries positively charged lithium ions from the anode 101 to the cathode 105 in discharge mode, as shown in FIG. 1 for example, and vice versa through the separator 105 in charge mode. The movement of the lithium ions creates free electrons in the anode 101 which creates a charge at the positive current collector 1078. The electrical current then flows from the current collector through the load 109 to the negative current collector 107A. The separator 103 blocks the flow of electrons inside the battery 100, allows the flow of lithium ions, and prevents direct contact between the electrodes.

While the battery 100 is discharging and providing an electric current, the anode 101 releases lithium ions to the cathode 105 via the separator 103, generating a flow of electrons from one side to the other via the coupled load 109. When the battery is being charged, the opposite happens where lithium ions are released by the cathode 105 and received by the anode 101.

The materials selected for the anode 101 and cathode 105 are important for the reliability and energy density possible for the battery 100. The energy, power, cost, and safety of current Li-ion batteries need to be improved in order to, for example, compete with internal combustion engine (ICE) technology and allow for the widespread adoption of electric vehicles (EVs). High energy density, high power density, and improved safety of lithium-ion batteries are achieved with the development of high-capacity and high-voltage cathodes, high-capacity anodes and functionally non-flammable electrolytes with high voltage stability and interfacial compatibility with electrodes. In addition, materials with low toxicity are beneficial as battery materials to reduce process cost and promote consumer safety.

The performance of electrochemical electrodes, while dependent on many factors, is largely dependent on the robustness of electrical contact between electrode particles, as well as between the current collector and the electrode particles. The electrical conductivity of silicon anode electrodes may be manipulated by incorporating conductive additives with different morphological properties. Carbon black (SuperP), vapor grown carbon fibers (VGCF), and a mixture of the two have previously been incorporated separately into the anode electrode resulting in improved performance of the anode. The synergistic interactions between the two carbon materials may facilitate electrical contact throughout the large volume changes of the silicon anode during charge and discharge.

State-of-the-art lithium-ion batteries typically employ a graphite-dominant anode as an intercalation material for lithium. Silicon-dominant anodes, however, offer improvements compared to graphite-dominant Li-ion batteries. Silicon exhibits both higher gravimetric (3579 mAh/g vs. 372 mAh/g for graphite) and volumetric capacities (2194 mAh/L vs. 890 mAh/L for graphite). In addition, silicon-based anodes have a lithiation/delithiation voltage plateau at about 0.3-0.4V vs. Li/Li+, which allows it to maintain an open circuit potential that avoids undesirable Li plating and dendrite formation. While silicon shows excellent electrochemical activity, achieving a stable cycle life for silicon-based anodes is challenging due to silicon's large volume changes during lithiation and delithiation. Silicon regions may lose electrical contact from the anode as large volume changes coupled with its low electrical conductivity separate the silicon from surrounding materials in the anode.

Battery electrodes need to be robust enough to be integrated in multiple different cell configurations. Some designs, such as pouch cells, may utilize electrodes in a planar configuration, while others, such as cylindrical cells, may utilize the electrodes in a coiled configuration. In a coiled configuration the electrodes need to be flexible enough to avoid cracking or other structural failures when wound at a tight radius. Higher pyrolysis/processing temperatures often result in improved electrical performance of electrodes, although this can lead to electrode brittleness, which can lead to some structural degradation when subjected to tight turning radii. Thus, in conventional electrodes, there is a tradeoff between performance and robustness. However, electrode robustness may be improved while maintaining cell performance through the use of multiple carbon precursor materials in the electrodes. This is shown further with respect to FIGS. 2-8.

FIG. 2 illustrates types of stress on battery electrodes, in accordance with an example embodiment of the disclosure. Referring to FIG. 2, there are shown a current collector 201, an optional adhesive 203, and an active material 205. There is also shown an electrode 213 sandwiched between two separator sheets 211A and 211B coiled around a rod 215. It should be noted that the adhesive 203 may or may not be present depending on the type of anode fabrication process utilized, as the adhesive is not necessarily there in a direct coating process where the active material is formed directly on the current collector. In an example scenario, the active material 205 comprises silicon particles in a carbon precursor material and a solvent, the active material 205 being pyrolyzed to turn the carbon precursor material into a glassy carbon that provides a structural framework around the silicon particles and also provides electrical conductivity. The active material may be coupled to the current collector 201 using the optional adhesive 203. The current collector 201 may comprise a metal film, such as copper, nickel, or titanium, for example, although other conductive foils may be utilized depending on desired tensile strength.

FIG. 2 also illustrates lithium ions impinging upon and lithiating the active material 205. The lithiation of silicon-dominant anodes causes expansion of the material, where horizontal expansion is represented by the x and y axes, and thickness expansion is represented by the z-axis, as shown. The current collector 201 has a thickness t, where a thicker foil provides greater strength and providing the adhesive 203 is strong enough, restricts expansion in the x- and y-directions, resulting in greater z-direction expansion, thus anisotropic expansion. Example thicker foils may be greater than 6 μm, such as 10 μm or 20 μm for copper, for example, while thinner foils may be less than 6 μm thick in copper.

In another example scenario, when the current collector 201 is thinner, on the order of 5-6 μm for a copper foil, for example, the active material 205 may expand more easily in the x- and y-directions, although still even more easily in the z-direction without other restrictions in that direction. In this case, the expansion is anisotropic, but not as much as compared to the case of higher x-y confinement.

In addition, different materials with different tensile strength may be utilized to configure the amount of expansion allowed in the x- and y-directions. For example, nickel is a more rigid, mechanically strong metal for the current collector 201, and as a result, nickel current collectors confine x-y expansion when a strong enough adhesive is used. In this case, the expansion in the x- and y-directions may be more limited, even when compared to a thicker copper foil, and result in more z-direction expansion, i.e., more anisotropic. In anodes formed with 5 μm nickel foil current collectors, very low expansion and no cracking results. Furthermore, different alloys of metals may be utilized to obtain desired thermal conductivity, electrical conductivity, and tensile strength, for example.

In an example scenario, when an adhesive is used, the adhesive 203 comprises a polymer such as polyimide (PI) or polyamide-imide (PAI) that provides adhesive strength of the active material film 205 to the current collector 201 while still providing electrical contact to the current collector 201. Other adhesives may be utilized depending on the desired strength, as long as they can provide adhesive strength with sufficient conductivity following processing. If the adhesive 203 provides a stronger, more rigid bond, the expansion in the x- and y-directions may be more restricted, assuming the current collector is also strong. Conversely, a more flexible and/or thicker adhesive may allow more x-y expansion, reducing the anisotropic nature of the anode expansion.

An example anode type is fabricated using PAI resin as the source for the carbon that binds the electrode components together. PAI nearly completely carbonizes around ~600° C., and as a result, the anode flexibility may be poor. To test the anode flexibility and the adhesion of electrode components, the anode may be placed between two separators and then pulled around a rod with 1-2 mm in diameter to mimic stresses an electrode might experience such as the winding process in producing cylindrical cells.

FIG. 2 also shows such an electrode robustness test, where an electrode 213 is coiled around a rod 215 to simulate a cylindrical cell configuration, where the diameter of the rod 215 may be configured at 1 to 2 mm, for example. In this manner the electrode 213 and separators 211A and 211B are subjected to stress that they would encounter in assembling a full cell. Brittle electrode active material may suffer structural cracks when bent at such a small radius.

Figure 3:
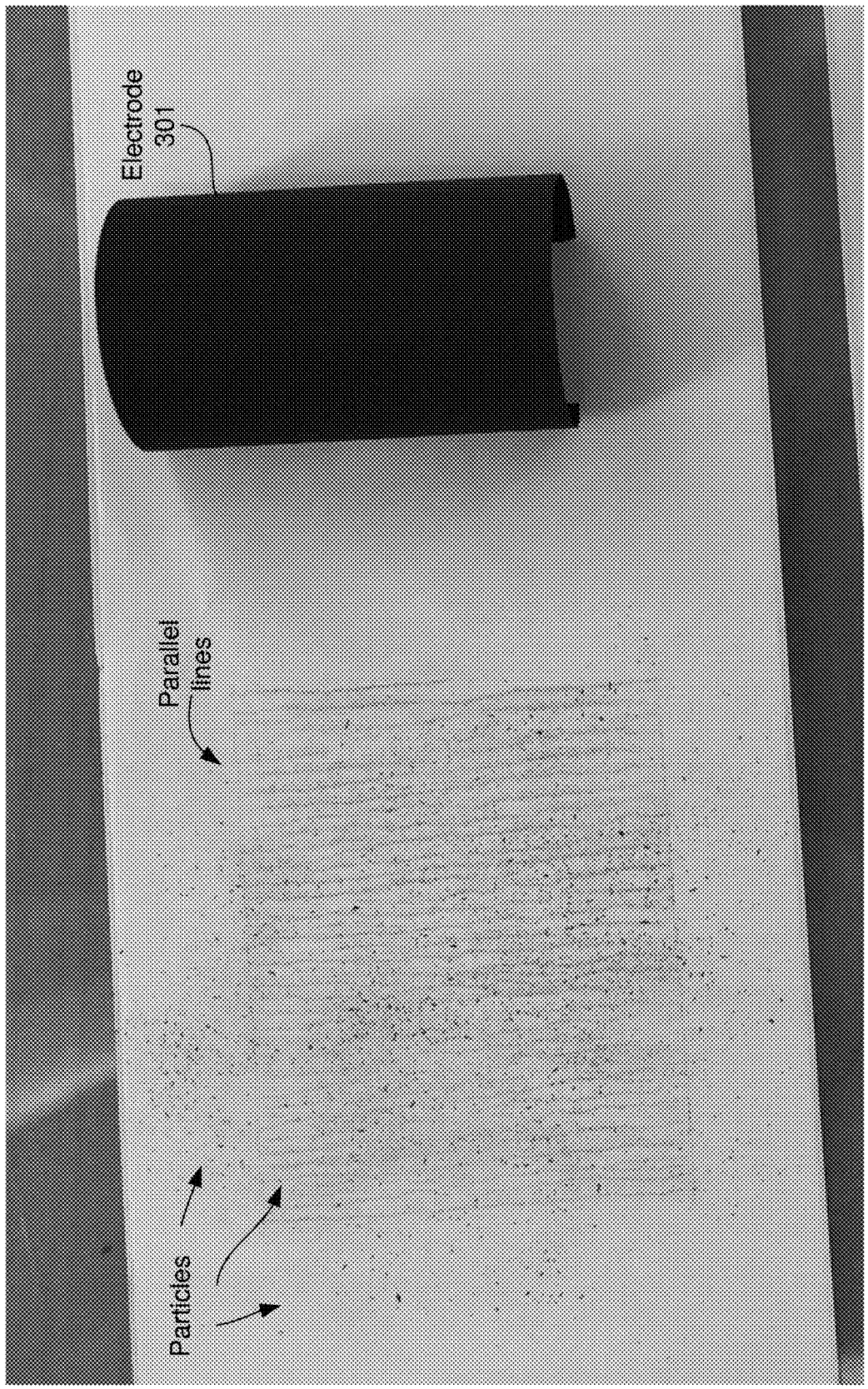
FIG. 3 illustrates results of an electrode robustness test for a fully pyrolyzed active material electrode, in accordance with an example embodiment of the disclosure.

FIG. 3 illustrates results of an electrode robustness test for a fully pyrolyzed active material electrode, in accordance with an example embodiment of the disclosure. Referring to FIG. 3, there is shown electrode 301 after being placed between two white separator/paper foils, wound around a rod (not shown), and then removed and placed flat on or near the white foil. The image reveals the formation of parallel lines as well as some loose particles on the separator which may be formed by the anode cracking and releasing pieces during the bending process. The material is brittle and cohesion of the layer is therefore compromised.

The brittleness of a pyrolyzed active material may be configured by utilizing multiple carbon sources with different pyrolysis temperatures. In one example, by combining PAI (a polymer carbon precursor with lower carbonization temperature) and PI (a polymer carbon precursor with higher carbonization temperature) and pyrolyze at temperatures between 500-800° C., a significant improvement in the flexibility, adhesion and cohesion of the anode can be observed.

Figure 4:
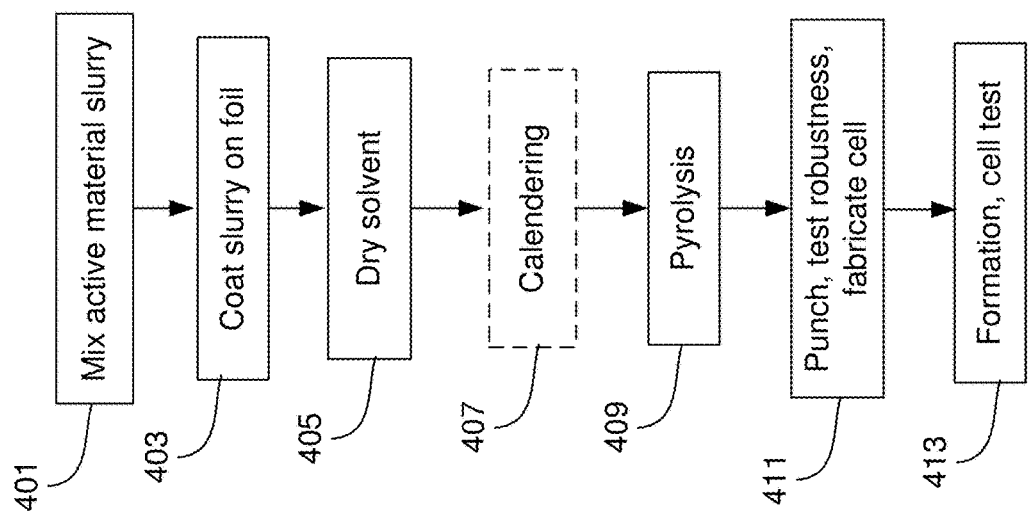
FIG. 4 is a flow diagram of a process for direct coating electrodes, in accordance with an example embodiment of the disclosure.

FIG. 4 is a flow diagram of a process for direct coating electrodes, in accordance with an example embodiment of the disclosure. This process comprises physically mixing the active material, conductive additive, and carbon precursor materials together, and coating it directly on a current collector. This example process comprises a direct coating process in which an anode slurry is directly coated on a copper foil using at least two carbon precursors such as PAI, PI, carboxymethyl cellulose (CMC), styrene-butadiene rubber (SBR), Sodium Alginate, polyacrylonitrile (PAN), and mixtures and combinations thereof.

In step 401, the raw electrode active material may be mixed using a carbon precursor/resin (such as PI and PAI), solvent, and optionally a conductive carbon. For example, silicon powder with desired particle size may be dispersed into PI and PAI under high shear dispersion for 1 hour followed by the addition of conductive carbon (such as graphite, graphene, Super P, ECP, or a combination) and additional dispersion for, e.g. 1-2 hours. The ratio of PI to PAI may be configured for a desired flexibility/robustness and electrical performance. When high surface area carbon additive like super P and ECP are used, the mixture may be dispersed under sonication for, e.g. 30-60 minutes to increase the homogeneity. Alternative to sonication mixing, ball mill may also be used as a high energy mixing method. The mixture may then be diluted with a solvent such as N-Methyl-pyrrolidone (NMP) using high shear dispersion at, e.g., 1000 rpm to achieve a slurry viscosity within 2000-4000 cP and a total solids content above 30%. Depending on the materials, the mixing method, speed, and duration may be varied to achieve a homogenous mixture. The particle size of the silicon powder and carbon additive may be varied to configure the active material density and/or roughness.

In step 403, the slurry may be coated on the foil at a loading of, e.g., 1.5-5 mg/cm$^2$, which may undergo drying in step 405 resulting in less than 20% residual solvent content. In step 407, an optional calendering process may be utilized where a series of hard pressure rollers may be used to finish the film/substrate into a smoother and denser sheet of material.

In step 409, the active material may be pyrolyzed by heating to 500-800° C. such that some of the carbon precursor material is partially converted into hard carbon and the remaining precursor is nearly completely or completely converted into hard carbon. In one example, nearly completely pyrolyzed may be more than 95% pyrolyzed. In another example, partially pyrolyzed may be 70% or less pyrolyzed. In another example scenario, the one or more completely or nearly completely pyrolyzed carbon precursors may be stiffer than the one or more partially pyrolyzed carbon precursors, with a Young's modulus 5 times or more than the Young's modulus of the partially pyrolyzed carbon precursor. In another example scenario, where the carbon precursor materials comprise PI and PAI, the percentage of weight loss with a 550° C. pyrolysis is 10% for PI and 15% for PAI. The pyrolysis step may result in an anode active material having silicon content greater than or equal to 50% by weight, where the anode has been subjected to heating at or above 400 degrees Celsius. Pyrolysis 409 can be done either before or after punching 411. If the punching 411 is done after the pyrolysis process 409, the pyrolysis may be performed in a roll form. A portion of the punched anode may be sandwiched with two separators and wrapped around a rod with a radius similar to that the anode will be subjected to in a cell. The anode may then be placed flat on a surface to test for residual material that has cracked off of the electrode. If acceptable, the remaining material may be sandwiched with a separator and a cathode and an electrolyte may be added to form a cell. In step 413, the cell may be subjected to a formation process, comprising initial charge and discharge steps to lithiate the anode, with some residual lithium remaining, and the cells may be tested for electrical performance.

Figure 5:
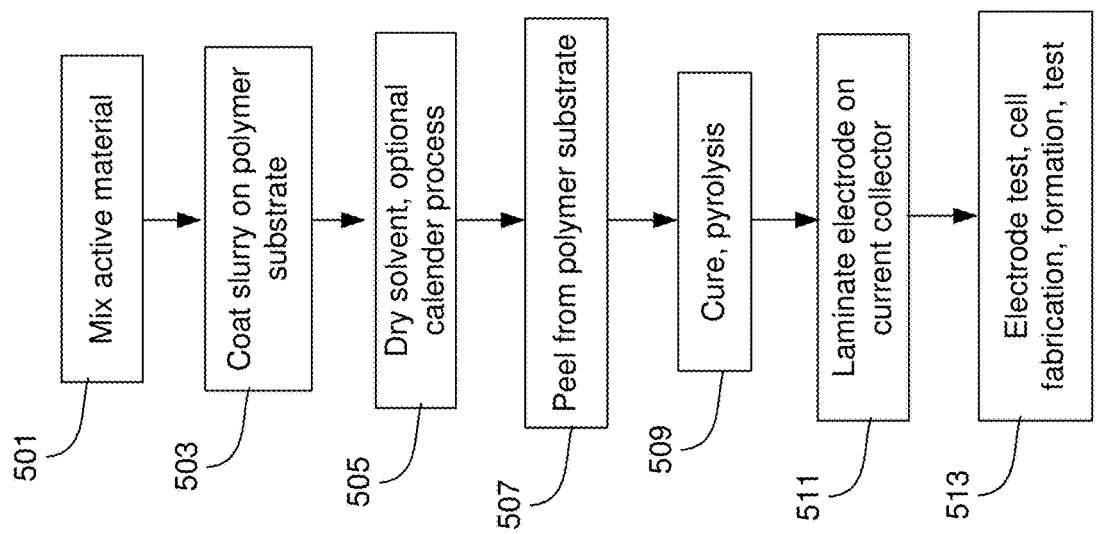
FIG. 5 is a flow diagram of an alternative process for lamination of electrodes, in accordance with an example embodiment of the disclosure.

FIG. 5 is a flow diagram of an alternative process for lamination of electrodes, in accordance with an example embodiment of the disclosure. While the previous process to fabricate composite anodes employs a direct coating process, this process physically mixes the active material, conductive additive, and carbon precursor together coupled with peeling and lamination processes.

This process is shown in the flow diagram of FIG. 5, starting with step 501 where the active material may be mixed comprising at least two carbon precursors/resins, such as polyimide (PI) and polyamide-imide (PAI), and a solvent. Other carbon precursors may be utilized, such as CMC, SBR, Sodium Alginate, PAN, and mixtures and combinations thereof, as long as different pyrolysis temperature materials are used. Optional additives include silosilazane, conductive carbon and/or a surface modification additive (e.g., surfactant, silane, and silosilazane). Similar to the process described in FIG. 4, silicon powder may be dispersed directly into the carbon precursor materials such as PI and PAI under high shear dispersion for 1 hour followed by the addition of optional conductive carbon and/or other additives. When high surface area carbon additives like Super P and ECP are used, the mixture may be dispersed under sonication for, e.g. 30-60 minutes to increase the homogeneity. Alternative to sonication, ball mill mixing may also be used as a high energy mixing method. The mixture may then be diluted with a solvent such as N-Methyl-pyrrolidone (NMP) using high shear dispersion at, e.g. 500-2000 rpm to achieve a slurry viscosity within 2000-4000 cP and a total solids content at around 20-40%. Independent of the materials used, the order of addition, mixing method, speed, and duration may be varied to achieve a homogenous mixture. The particle size may be varied to configure the active material density and/or roughness.

In step 503, the slurry may be coated on a polymer substrate, such as polyethylene terephthalate (PET, e.g., Mylar) or polypropylene (PP). The slurry may be coated on the PET/PP/Mylar film at a loading of 1.5-5 mg/cm$^2$ (with 13-20% solvent content), and then dried to remove a portion of the solvent in step 505. An optional calendering process may be utilized where a series of hard pressure rollers may be used to finish the film/substrate into a smoothed and denser sheet of material.

In step 507, the green film may then be removed from the PET, where the active material may be peeled off the polymer substrate, the peeling process being optional for a polypropylene (PP) substrate, since PP can leave ~2% char residue upon pyrolysis. The peeling may be followed by a cure and pyrolysis step 509 where the film may be cut into sheets, and vacuum dried using a two-stage process (100-140° C. for 12-16 hours, 200-240° C. for 4 to 6 hours). The dry film may be thermally treated at 550-1300° C. to convert the polymer matrix into carbon, where one of the carbon precursors is partially pyrolyzed and the one or more other carbon precursors is nearly completely or completely pyrolyzed. In one example, nearly completely pyrolyzed may be more than 95% pyrolyzed. In another example, partially pyrolyzed may be 70% or less pyrolyzed. In another example scenario, the one or more completely or nearly completely pyrolyzed carbon precursors may be stiffer than the one or more partially pyrolyzed carbon precursors, with a Young's modulus 5 times or more than the Young's modulus of the partially pyrolyzed carbon precursor. In another example scenario, where the carbon precursor materials comprise PI and PAI, the percentage of weight loss with a 550° C. pyrolysis is 10% for PI and 15% for PAI. The pyrolysis step may result in an anode active material having silicon content greater than or equal to 50% by weight, where the anode has been subjected to heating at or above 400 degrees Celsius.

In step 511, the pyrolyzed material may be flat press or roll press laminated on the current collector, where a copper foil may be coated with polyamide-imide with a nominal loading of 0.35-0.75 mg/cm$^2$ with 15-20% residual solvent (applied as a 5-7 wt % varnish in NMP, dried 10-20 hours at 100-140° C. under vacuum). In flat press lamination, the silicon-carbon composite film may be laminated to the coated copper using a heated hydraulic press (30-70 seconds, 250-350° C., and 3000-5000 psi), thereby forming the finished silicon-composite electrode. In another embodiment, the pyrolyzed material may be roll-press laminated to the current collector.

In step 513, a portion of laminated anode may be sandwiched with two separators and wrapped around a rod with a radius similar to that the anode will be subjected to in a cell. The anode may then be placed flat on a surface to test for residual material that has cracked off of the electrode. If acceptable, the remaining material may be sandwiched with a separator and a cathode and an electrolyte to form a cell. The cell may be subjected to a formation process, comprising initial charge and discharge steps to lithiate the anode, with some residual lithium remaining, and the cells may be tested for electrical performance.

As stated above, fully pyrolyzed carbon precursors may have reduced structural robustness due to the brittle nature of the material after pyrolysis. By utilizing carbon precursors with different carbonization/pyrolysis profiles, the brittleness of the electrode active material may be configured with varying levels of carbon precursor conversion.

Figure 6:
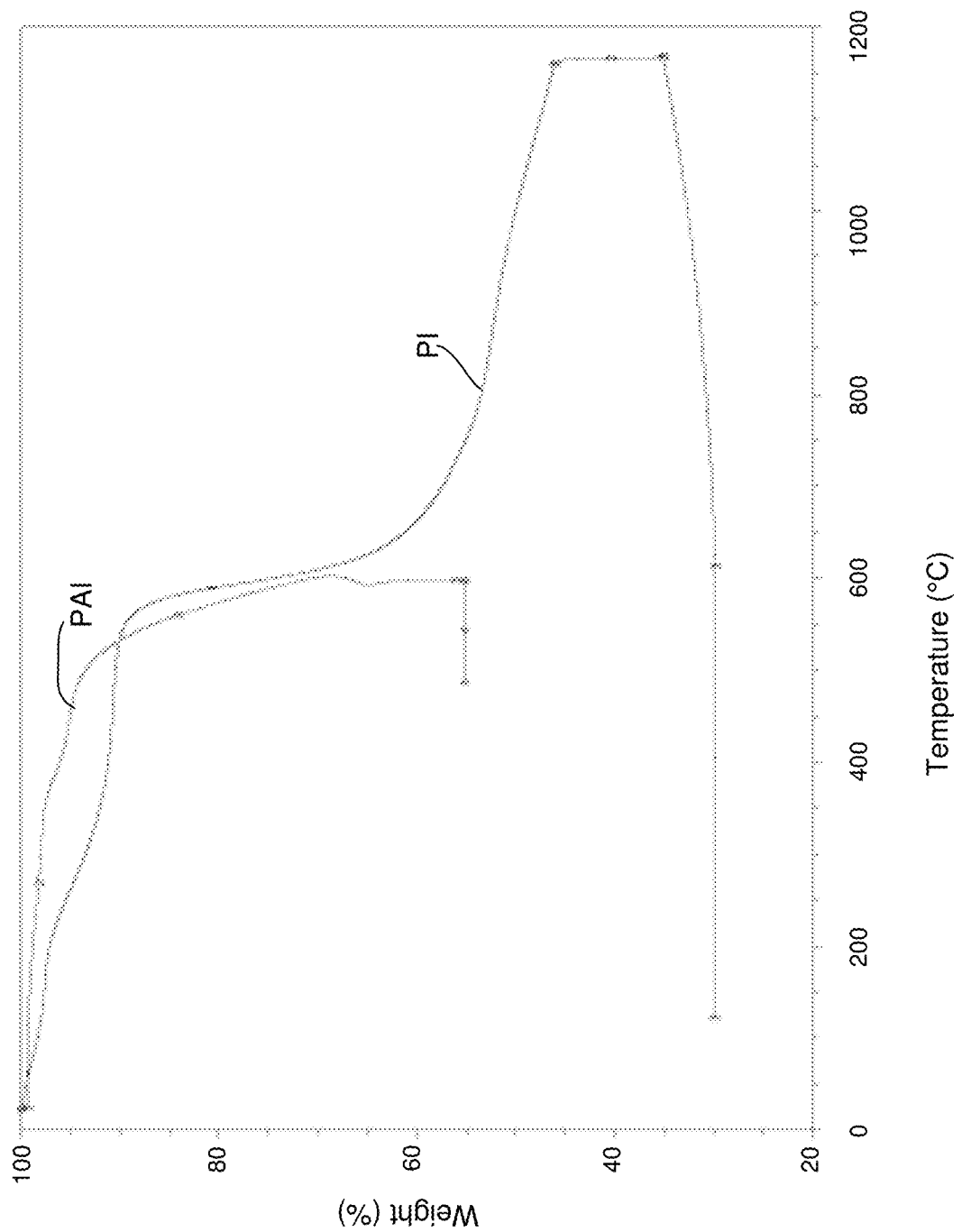
FIG. 6 illustrates the thermal gravimetric analysis of PI and PAI, in accordance with an example embodiment of the disclosure.

FIG. 6 illustrates the thermal gravimetric (TGA) analysis of PI and PAI, in accordance with an example embodiment of the disclosure. The TGA curves extend up to 600° C. for PAI and over 1000° C. for PI. The curves show that both fully pyrolyzed and partially pyrolyzed materials may result when pyrolyzing in a temperature range around the transition temperatures shown in the plot. For example, pyrolyzing the active material in the 550 to 740° C. range may result in mostly or complete conversion of PAI and only partial conversion of the PI carbon precursor, where the partially converted carbon precursor may enhance flexibility, adhesion, and cohesion of the anode.

Figure 7:
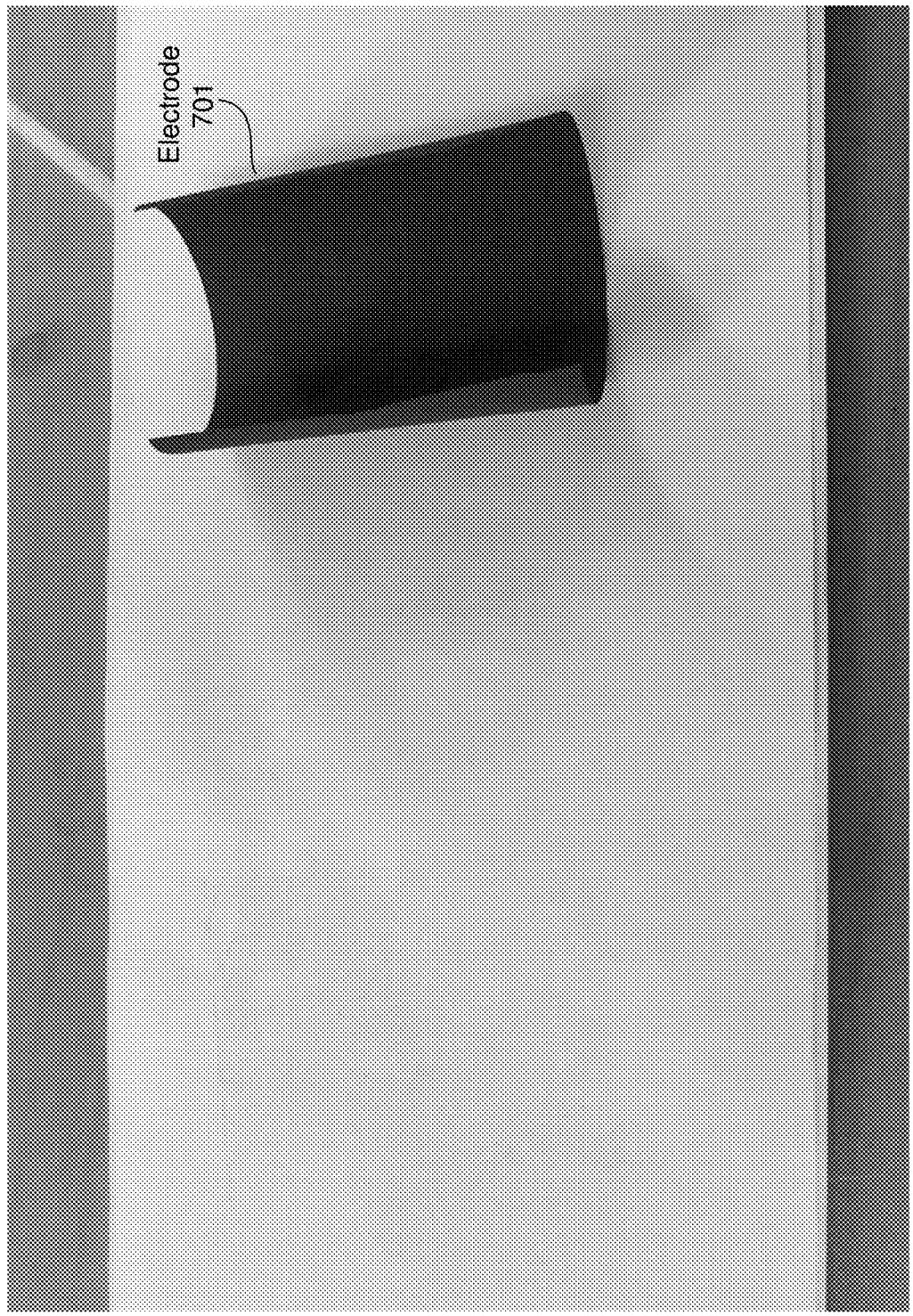
FIG. 7 illustrates results of an electrode robustness test for an anode with both fully pyrolyzed active material and partially pyrolyzed active material, in accordance with an example embodiment of the disclosure.

FIG. 7 illustrates results of an electrode robustness test for an anode with both fully pyrolyzed active material and partially pyrolyzed active material, in accordance with an example embodiment of the disclosure. Referring to FIG. 7, there is shown electrode 701 after being wound around a rod (not shown) with a 1 to 2 mm diameter and then removed and placed flat on a white surface.

As can be seen in FIG. 7, there are no parallel lines or loose particles indicating the increased flexibility, adhesion, and cohesion of the anode, which is due to partially carbonized resin in the anode and perhaps due to a strong interaction between the polyimide (PI) and polyamideimide (PAI) that improves the binding capability of the pyrolyzed anode to the copper as well as the silicon particles.

For single carbon precursor anodes, a more flexible active material generally results in higher resistance of the electrode, which is detrimental to device performance. However, by utilizing both PAI and PI as carbon precursors and pyrolyzing at temperatures that result in both fully and partially converted carbon precursor material, improved resistance may be enabled.

Figure 8:
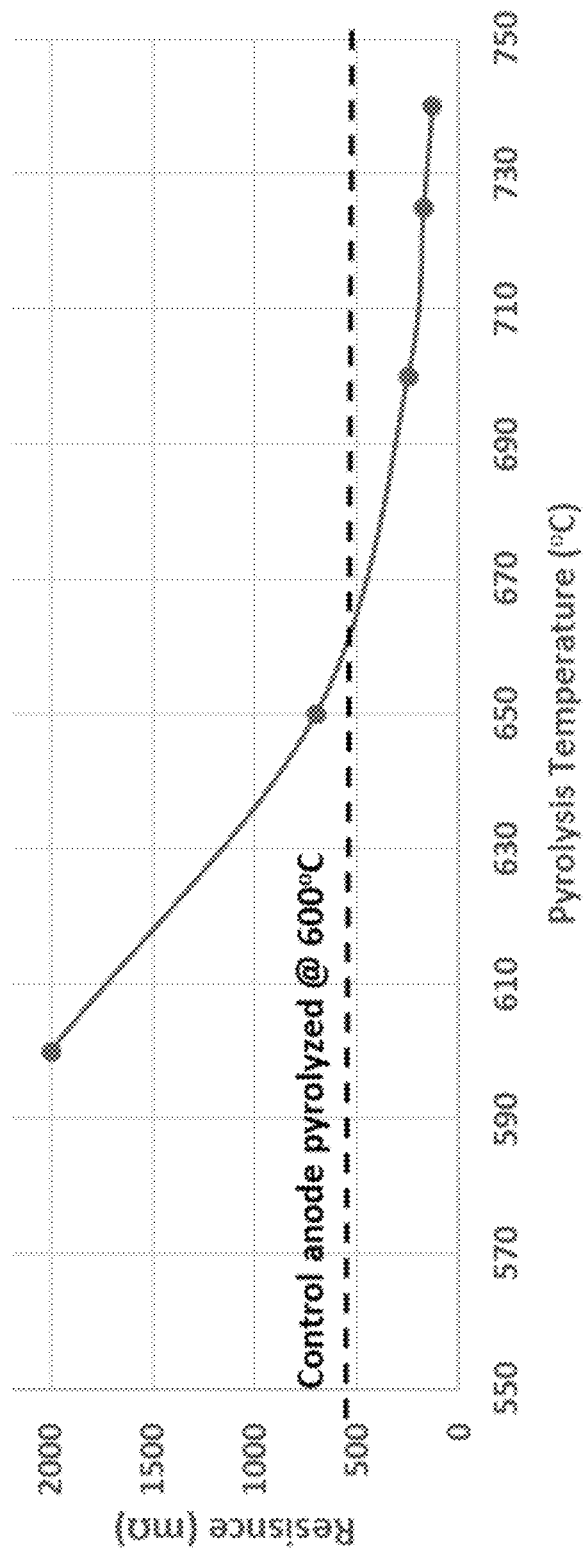
FIG. 8 illustrates through-resistance of a multi-carbon source anode and a control anode, in accordance with an example embodiment of the disclosure.

FIG. 8 illustrates through-resistance of a multi-carbon source anode and a control anode, in accordance with an example embodiment of the disclosure. Referring to FIG. 8, there is shown the resistance of the control anode pyrolyzed at 600° C., indicated by the dashed line, at about 550 mΩ. The PI:PAI ratio in this example is 1:1, although other ratios are possible depending on the desired flexibility. The ratio of different polymers may be selected to increase flexibility of the electrode while still having good electrical conductivity with a pyrolyzed carbon precursor by selecting a heat-treatment temperature where one of the polymers will be pyrolyzed enough to provide conductivity while the other polymer remains in a less pyrolyzed state to provide flexibility and robustness. In an example scenario, the one or more completely or nearly completely pyrolyzed carbon precursors is stiffer than the one or more partially pyrolyzed carbon precursor, with a Young's modulus 5 times or more than the Young's modulus of the partially pyrolyzed carbon precursor.

The curve represents the anode through-resistance with various pyrolysis temperatures. As it is evident from this curve, the resistance of the anode decreases by increasing the pyrolysis temperature. The anode pyrolyzed up to 740° C. still demonstrates excellent flexibility while the anode pyrolyzed at 750° C. shows signs of microcracks during the winding test. The control anode does not pass the winding test at all tested temperatures. This plot indicates that utilizing two or more carbon sources with different pyrolysis curves enables a configurable electrode robustness and electrical performance. It should be noted that while this example is for an anode, multi-carbon sources are applicable to cathode structures too.

In an embodiment of the disclosure, a method and system for multiple carbon precursors for enhanced battery electrode robustness may include an electrode comprising an active material on a current collector, the active material comprising two or more carbon precursor materials and an additive, wherein the carbon precursor materials comprise different pyrolysis temperatures. A battery may comprise the electrode. The carbon precursor materials may comprise polyimide (PI) and polyamide-imide (PAI). The active material may be pyrolyzed at a temperature such that a first carbon precursor material is partially pyrolyzed and a second carbon precursor material is nearly completely pyrolyzed or completely pyrolyzed. In one example, nearly completely pyrolyzed may be more than 95% pyrolyzed. In another example, partially pyrolyzed may be 70% or less pyrolyzed. In another example scenario, the one or more completely or nearly completely pyrolyzed carbon precursors may be stiffer than the one or more partially pyrolyzed carbon precursors, with a Young's modulus 5 times or more than the Young's modulus of the partially pyrolyzed carbon precursor. The carbon precursor materials may comprise two or more of PI, PAI, carboxymethyl cellulose (CMC), styrene-butadiene rubber (SBR), polyacrylonitrile (PAN), and sodium alginate. The active material may comprise silicon constituting at least 50% of weight of a formed anode after pyrolysis. The active material may comprise silicon constituting up to 97% of weight of a formed electrode after pyrolysis. The current collector may comprise copper, nickel, titanium, steel, or aluminum. The current collector does not crack when wound around a 2 mm diameter rod. The additive may comprise at least one of ECP, ECP600, Super-P, and SLP.

An example method, in accordance with the present disclosure, comprises mixing forming electrodes with an active material comprising two or more carbon-based carbon precursors, and a carbon-based additive. In an example implementation, the anode active material yields silicon constituting 50% or more and up to 92% of weight of a formed anode after pyrolysis. In an example implementation, the anode active material comprises polyamide-imide (PAI) and PI.

As utilized herein the terms "circuits" and "circuitry" refer to physical electronic components (i.e. hardware) and any software and/or firmware ("code") which may configure the hardware, be executed by the hardware, and or otherwise be associated with the hardware. As used herein, for example, a particular processor and memory may comprise a first "circuit" when executing a first one or more lines of code and may comprise a second "circuit" when executing a second one or more lines of code. As utilized herein, "and/or" means any one or more of the items in the list joined by "and/or". As an example, "x and/or y" means any element of the three-element set {(x), (y), (x, y)}. In other words, "x and/or y" means "one or both of x and y". As another example, "x, y, and/or z" means any element of the seven-element set {(x), (y), (z), (x, y), (x, z), (y, z), (x, y, z)}. In other words, "x, y and/or z" means "one or more of x, y and z". As utilized herein, the term "exemplary" means serving as a non-limiting example, instance, or illustration. As utilized herein, the terms "e.g.," and "for example" set off lists of one or more non-limiting examples, instances, or illustrations. As utilized herein, a battery, circuitry or a device is "operable" to perform a function whenever the battery, circuitry or device comprises the necessary hardware and code (if any is necessary) or other elements to perform the function, regardless of whether performance of the function is disabled or not enabled (e.g., by a user-configurable setting, factory trim, configuration, etc.).

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

The invention claimed is:

1. An electrode comprising:
an active material comprising two or more pyrolyzed carbon precursor materials, wherein the carbon precursors have been pyrolyzed at a temperature such that a first precursor is 70% or less pyrolyzed and a second precursor is 95% or more pyrolyzed.

2. The electrode according to claim 1, wherein a battery comprises the electrode.

3. The electrode according to claim 1, wherein the carbon precursor materials comprise polyimide (PI) and polyamide-imide (PAI).

4. The electrode according to claim 1, wherein the active material is pyrolyzed at a temperature such that a first carbon precursor material is partially pyrolyzed and a second carbon precursor material is completely pyrolyzed.

5. The electrode according to claim 4, wherein a ratio of a Young's modulus of the second carbon precursor material after pyrolysis to that of a Young's modulus of the first carbon precursor after pyrolysis is 5 or more.

6. The electrode according to claim 1, wherein the carbon precursor materials comprise two or more of PI, PAI, carboxymethyl cellulose (CMC), styrene-butadiene rubber (SBR), polyacrylonitrile (PAN), and sodium alginate.

7. The electrode according to claim 1, wherein the active material comprises silicon constituting at least 50% of weight of a formed anode after pyrolysis.

8. The electrode according to claim 1, wherein the active material comprises silicon constituting up to 97% of weight of a formed electrode after pyrolysis.

9. The electrode according to claim 1, wherein the active material is on a current collector that comprises copper, nickel, titanium, steel, or aluminum.

10. The electrode according to claim 1, wherein the active material on does not crack when wound around a 2 mm diameter rod.

11. The electrode according to claim 1, wherein the active material comprises conductive carbon sources.

12. A method comprising:
forming an electrode comprising an active material comprising two or more pyrolyzed carbon precursor materials, wherein the pyrolyzed carbon precursor materials are pyrolyzed at a temperature such that a first precursor is 70% or less pyrolyzed and a second precursor is 95% or more pyrolyzed.

13. The method according to claim 12, wherein a battery comprises the electrode.

14. The method according to claim 12, wherein the carbon precursor materials comprise polyimide (PI) and polyamide-imide (PAI).

15. The method according to claim 12, comprising pyrolyzing the active material at a temperature such that a first carbon precursor material is partially pyrolyzed and a second carbon precursor material is completely pyrolyzed.

16. The method according to claim 15, wherein a ratio of a Young's modulus of the second carbon precursor material after pyrolysis to that of a Young's modulus of the first carbon precursor material after pyrolysis is 5 or more.

17. The method according to claim 12, wherein the carbon precursor materials comprise two or more of PI, PAI, carboxymethyl cellulose (CMC), styrene-butadiene rubber (SBR), polyacrylonitrile (PAN), and sodium alginate.

18. The method according to claim 12, wherein the active material comprises silicon constituting at least 50% of weight of a formed anode after pyrolysis.

19. The method according to claim 12, wherein the active material comprises conductive carbon sources.

20. The method according to claim 12, wherein the active material is on a current collector that comprises copper, nickel, titanium, steel, or aluminum.

21. The method according to claim 12, wherein the active material does not crack when wound around a 2 mm diameter rod.

22. An electrode, the electrode comprising:
an active material comprising pyrolyzed polyimide (PI) and polyamide-imide (PAI) carbon precursor materials and an additive, wherein the PI is pyrolyzed less than 70% and the PAI is pyrolyzed more than 95%.

* * * * *